(12) United States Patent
Thielen et al.

(10) Patent No.: US 8,205,292 B1
(45) Date of Patent: Jun. 26, 2012

(54) WIPER ARM HAVING SWIVEL COVER ALLOWING ACCESS TO THE HEAD AND PIVOT SHAFT

(75) Inventors: C. Joseph Thielen, Shelby Township, MI (US); Mitica Polocoser, Wayne, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 13/070,897

(22) Filed: Mar. 24, 2011

(51) Int. Cl.
*B60S 1/34* (2006.01)

(52) U.S. Cl. .................. 15/250.351; 15/250.34

(58) Field of Classification Search ............... 15/250.3, 15/250.31, 250.34, 250.351, 250.352
See application file for complete search history.

(56) References Cited

U.S. PATENT DOCUMENTS

| | | | | |
|---|---|---|---|---|
| 2,215,371 | A | * | 9/1940 | Horton ............ 15/250.202 |
| 3,126,216 | A | | 3/1964 | Krohm |
| 3,512,205 | A | * | 5/1970 | Riester et al. ........ 15/250.34 |
| 3,729,767 | A | | 5/1973 | Edele et al. |
| 5,233,720 | A | | 8/1993 | Schoen |
| 6,658,691 | B2 | | 12/2003 | Muramatsu |
| 6,665,903 | B2 | | 12/2003 | Hayakawa et al. |
| 6,687,949 | B2 | | 2/2004 | Zimmer |
| 2002/0152575 | A1 | | 10/2002 | Tsukamoto et al. |
| 2007/0136975 | A1 | | 6/2007 | Van De Rovaart |

FOREIGN PATENT DOCUMENTS

| | | |
|---|---|---|
| DE | 43 33 554 A1 | 10/1994 |
| DE | 196 23 597 A1 | 12/1997 |
| DE | 196 53 033 A1 | 6/1998 |
| DE | 102 17 600 A1 | 11/2002 |
| DE | 10 2004 017 447 A1 | 11/2005 |
| DE | 10 2008 034 373 A1 | 2/2010 |
| EP | 0 753 439 A1 | 1/1997 |
| FR | 2 543 897 | 10/1984 |
| FR | 2 746 740 | 10/1997 |
| FR | 2 746 750 | 10/1997 |
| FR | 2 774 050 | 3/1999 |
| GB | 642188 | 8/1950 |
| GB | 756229 | 9/1956 |
| GB | 1 435 778 | 5/1976 |
| JP | 2000 95070 | 4/2000 |
| JP | 2001 247015 | 9/2001 |
| JP | 2001 301580 | 10/2001 |
| JP | 2002 120696 | 4/2002 |
| JP | 2006 76522 | 3/2006 |
| JP | 2006 76523 | 3/2006 |
| JP | 2006 213325 | 8/2006 |
| JP | 2006 248329 | 9/2006 |
| JP | 2006 281954 | 10/2006 |
| JP | 2006 298146 | 11/2006 |

(Continued)

*Primary Examiner* — Gary Graham
(74) *Attorney, Agent, or Firm* — Bliss McGlynn, P.C.

(57) ABSTRACT

A windshield wiper arm assembly that is adapted to support a wiper blade as it moves across a surface to be wiped. The windshield wiper arm assembly includes a body and a head supported by the body and adapted to be mounted to a pivot shaft that defines a pivot axis P and drives the wiper blade in an oscillating manner across the surface to be wiped. The body also includes an opening providing access to the head mounted to the pivot shaft. A cover is mounted to the body at the opening and is movable about an axis A substantially parallel to the pivot axis P from a first position closing the opening to a second position allowing access to the head.

18 Claims, 4 Drawing Sheets

FOREIGN PATENT DOCUMENTS

| | | |
|---|---|---|
| JP | 2006 298278 | 11/2006 |
| JP | 2007 153152 | 6/2007 |
| JP | 2007 153153 | 6/2007 |
| JP | 2008 94376 | 4/2008 |
| JP | 2008 168831 | 7/2008 |

\* cited by examiner

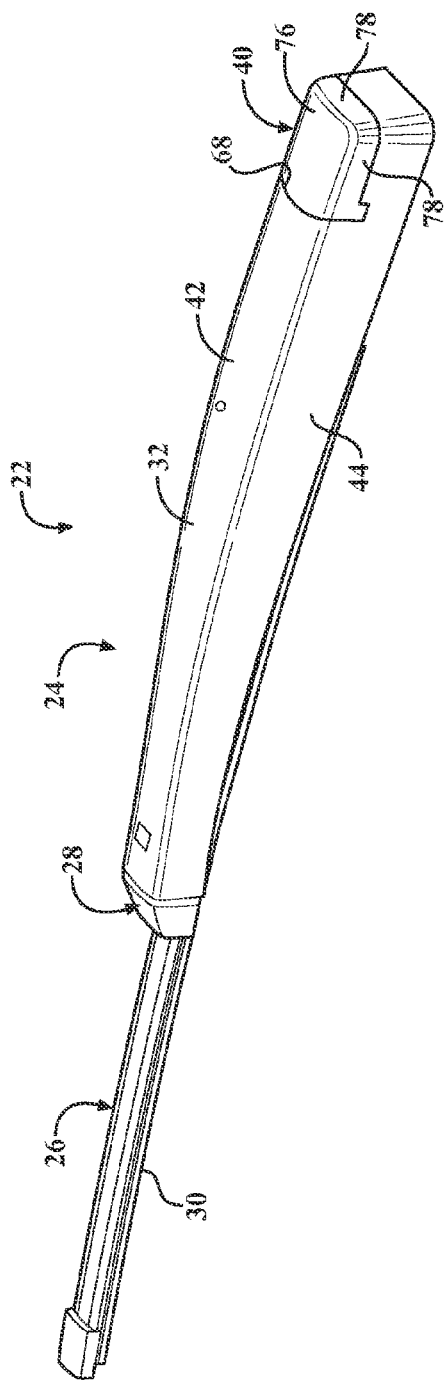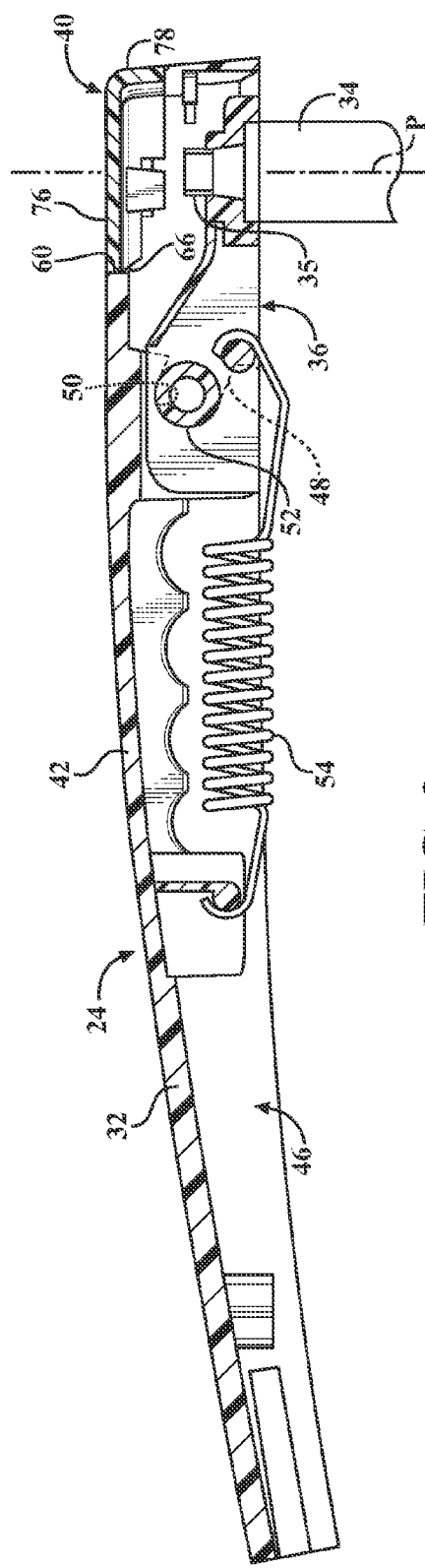
FIG. 2
FIG. 3

WIPER ARM HAVING SWIVEL COVER ALLOWING ACCESS TO THE HEAD AND PIVOT SHAFT

BACKGROUND OF THE INVENTION

1. Field of the Invention

The present invention relates, generally, to windshield wiper assemblies and, more specifically, to a windshield wiper arm assembly that is adapted to support a wiper blade as it moves across a surface to be wiped and having a swivel cover that allows access to the head and pivot shaft.

2. Description of the Related Art

Conventional windshield wiper assemblies known in the related art include some type of wiper blade assembly mounted to an arm which, in turn, is mounted adjacent to a surface to be wiped, such as a windshield. The wiper arm is pivotally driven to impart reciprocal motion to the wiper blade assembly across the windshield. A rubber wiping element is supported by the blade assembly and contacts the windshield across the surface to be wiped. The wiper blade is commonly either of the "tournament" or "beam blade" type. Both types of wiper assemblies commonly known in the related art typically incorporate one or more metal strips that act to reinforce the wiper element and facilitate wiping contact by the element across what is typically a curved glass surface. In this context, the wiper arm delivers a downward force to the blade assembly that is distributed thereacross, pressing the blade assembly into contact with the surface to be wiped.

The wiper arm is typically driven by an electric motor through a pivot shaft. The arm is mounted to the shaft via a head. Some arms include an opening that allow access to the head at the pivot shaft to facilitate mounting the arm thereto. A removable cover is often employed to close the opening when access to the connection between the head and the pivot shaft is not needed.

While the designs for such systems known in the related art have generally worked for their intended purposes, some deficiencies still remain. Many covers known in the related art also present a gap between the head cover and the arm body. Thus, arms having covers of the type generally known in the related art can be prone to allow water, snow, or ice to enter the opening even when closed. This can be detrimental to the arm's function. Moreover, covers of these type are also susceptible to snagging on brushes or cloths, typically employed in car washes, and can be inadvertently removed from the arm and thus lost during this process. These problems are not limited to, but are especially prevalent in connection with, windshield wiper systems used to clean the rear window of a vehicle.

Thus, there remains a need in the art for a windshield wiper arm assembly that employs a head cover that efficiently and effectively provides for access to the head and the pivot shaft, but which is not susceptible to intrusion by water, snow, or ice and which is not easily dislodged or inadvertently removed during the process of washing the car and other interference with the wiper arm.

SUMMARY OF THE INVENTION

The present invention overcomes many limitations and disadvantages in the related art in a windshield wiper arm assembly that is adapted to support a wiper blade as it moves across a surface to be wiped. The windshield wiper arm assembly includes a body and a head supported by the body and adapted to be mounted to a pivot shaft that defines a pivot axis and drives the wiper blade in an oscillating manner across the surface to be wiped. The body also includes an opening providing access to the head mounted to the pivot shaft. A cover is mounted to the body at the opening and is movable about an axis substantially parallel to the pivot axis from a first position closing the opening to a second position allowing access to the head.

In this way, the windshield wiper arm assembly of the present invention employs a head cover that efficiently and effectively provides access to head and the pivot shaft, but that is not susceptible to intrusion by water, snow, or ice and that is not easily dislodged or inadvertently removed during the process of washing the car and other interference with the wiper arm.

Other objects, features and advantages of the present invention will be readily appreciated as the same becomes better understood after reading the subsequent description taken in connection with the accompanying drawings.

BRIEF DESCRIPTION OF THE DRAWINGS

FIG. 2 is a perspective view of the wiper arm assembly of the present invention;

FIG. 3 is a cross-sectional side view of the wiper arm assembly of the present invention;

DETAILED DESCRIPTION OF THE PREFERRED EMBODIMENT(S)

Figure 1:
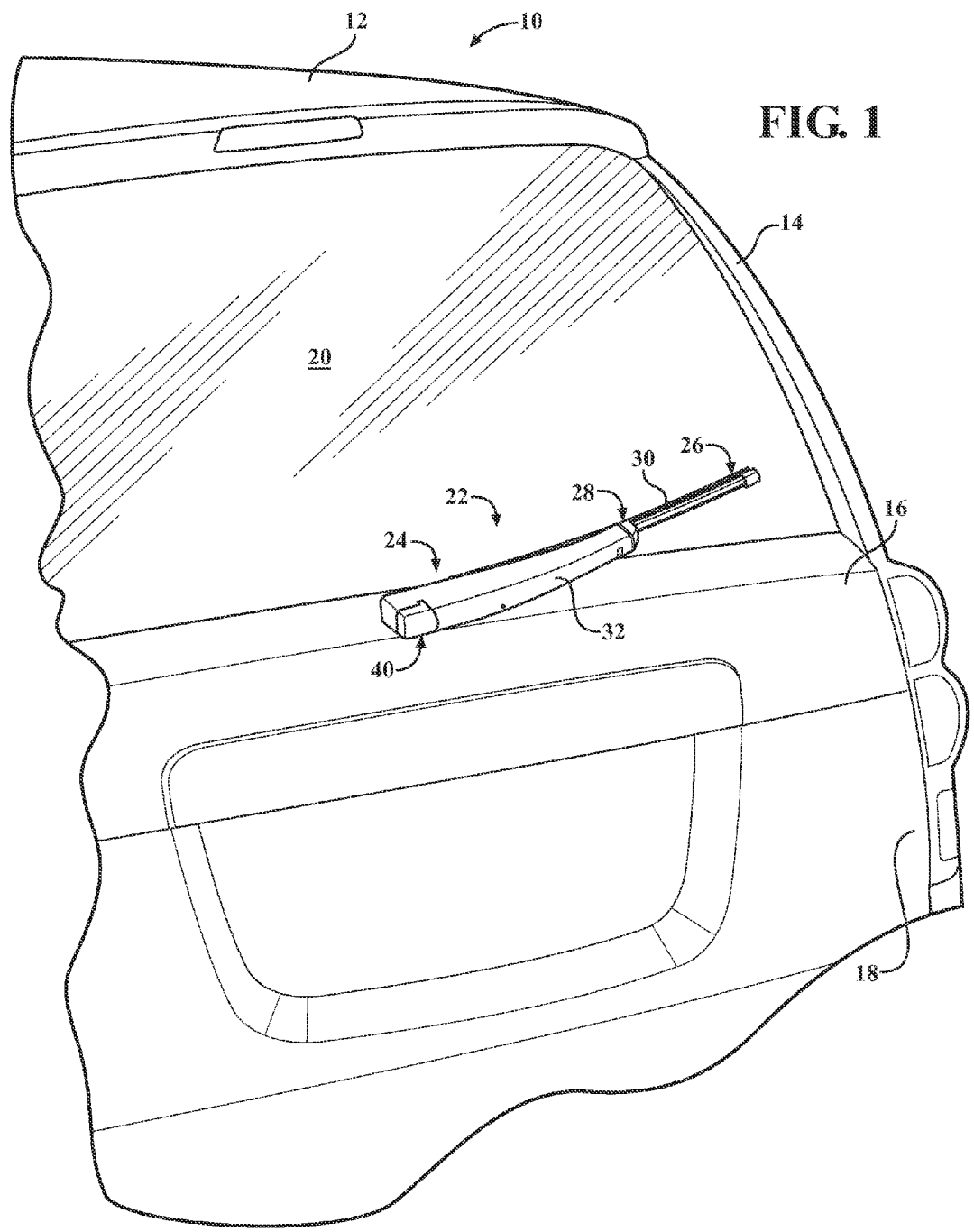
FIG. 1 is a partial perspective view of a representation of a rear of a vehicle.

Referring now to the figures, where like numerals are used to designate like structure, a portion of a vehicle is schematically illustrated at 10 in FIG. 1. More specifically, the portion of the vehicle that has been employed to illustrate the present invention includes a generic illustration of a rear of a vehicle. Thus, the vehicle includes a roof 12, a pair of pillars 14 (only one of which is shown in FIG. 1), a lift gate 16, and the rear of the vehicle 18. A glass rear window 20 extends between the pillars 14 on the lift gate 16. While the rear of the vehicle illustrated herein employs a lift gate 16, those having ordinary skill in the art will appreciate from the description that follows that the vehicle could include a hatch back or any other commonly known configuration without departing from the scope of the present invention.

A wiper system is generally indicated at 22 in FIG. 1 and in the embodiment illustrated here, is employed to clean the rear glass window 20. The wiper system 22 includes a wiper arm assembly, generally indicated at 24 and a windshield wiper blade, generally indicated at 26, (hereinafter referred to as a "wiper blade"). In the embodiment illustrated herein, the wiper arm assembly 24 is operatively mounted to the lift gate 16 and is moveable in an oscillating fashion to move the wiper blade 26 across the rear window 20. The wiper blade 26 is releasably engaged to the wiper arm assembly 24 via a coupler assembly, generally indicated at 28, that operatively interconnects the wiper blade 26 and windshield wiper arm assembly 24. The wiper blade 26 is adapted to clean the surface to be wiped, in this case, a rear window 20. Those having ordinary skill in the art will appreciate that a wiper system 22 may include other components besides the wiper arm assembly 24 and wiper blade 26. Furthermore, those having ordinary skill in the art will appreciate that the wiper arms 24 and wiper blades 26 may be employed in other areas of a vehicle 10, such as a front windshield (not shown) or a head lamp (not shown) that employs a wiper system 22. Thus, it will be understood that the present invention is not limited for use solely in connection with wiper arms 24 adjacent to a vehicle's rear window 20, but for use in all applications where wiper blades 26 are employed.

The wiper blade 26 has a wiping element 30 that includes a predetermined length and cross-sectional profile corresponding to a particular application and is typically manufactured through an extrusion process, which enables the length and cross-sectional profile of the wiping element 30 to be easily adjusted without a substantial increase to manufacturing expense. Furthermore, while the wiping element 30 is constructed from a flexible rubber. Those having ordinary skill in the art will appreciate that the wiping element 30 may be constructed from any flexible material, such as silicone or other polymer, and via any manufacturing process, such as injecting molding, without departing from the scope of the invention.

Those having ordinary skill in the art will also appreciate that the wiper blade 26 may be of either the tournament or beam blade type having any standard construction as is commonly known in the art. Thus, whether the wiper blade is a tournament or beam style blade, it will generally distribute downward pressure from the wiper arm 24 across the wiping element 30. Moreover, the wiper blade 26 may be curved longitudinally with a predetermined radius of curvature that is the same or greater than the plane of curvature of the rear window 20, if any. This predetermined radius of curvature is sometimes referred to in the related art as a "free form" radius of curvature (hereinafter "windshield curvature"). Accordingly, the curvature of the wiper blade 26 may be symmetrical or asymmetrical depending on the force requirements and the contour of the surface to be wiped. The flexible, free form, pre-curved wiper blade 26 straightens out when the wiper arm 24 applies a force thereto to flatten it and direct the wiping element 30 to contact the surface to be wiped. Thus, the wiper blade 26 may include a free-form curvature that ensures force distribution on rear windows 20 or windshields having various curvatures that effects proper wrapping about the surface to be wiped. The wiper blade 26 may also include an airfoil to reduce the likelihood of wind lift during operational movement across the surface to be wiped. However, those having ordinary skill in the art will appreciate that the airfoil is optional, especially where the wiper blade 26 is employed on a rear window 20.

Figure 4:
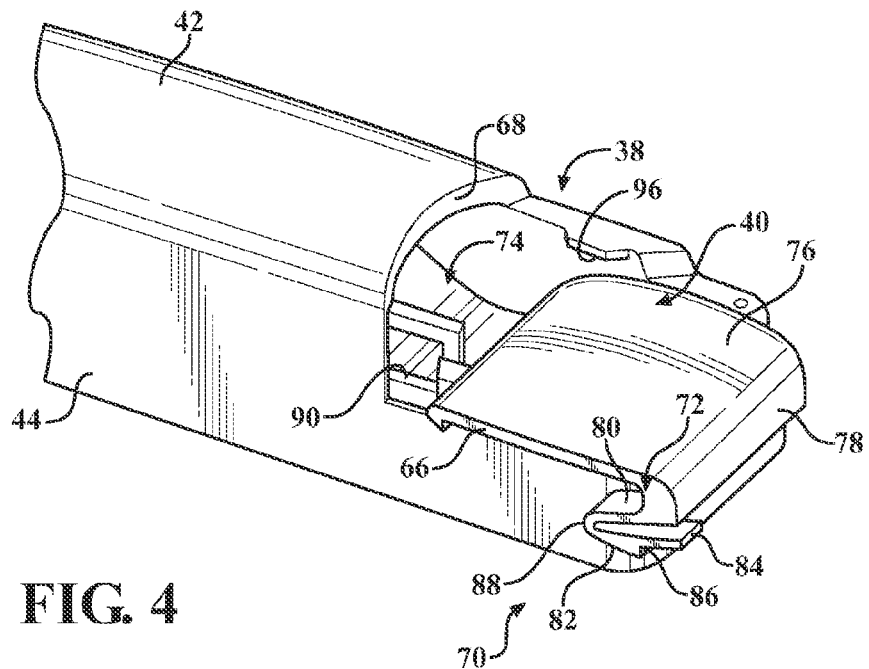
FIG. 4 is a partial perspective view of one end of the wiper arm assembly of the present invention showing the head cover disposed between its open and closed positions.
Figure 5:
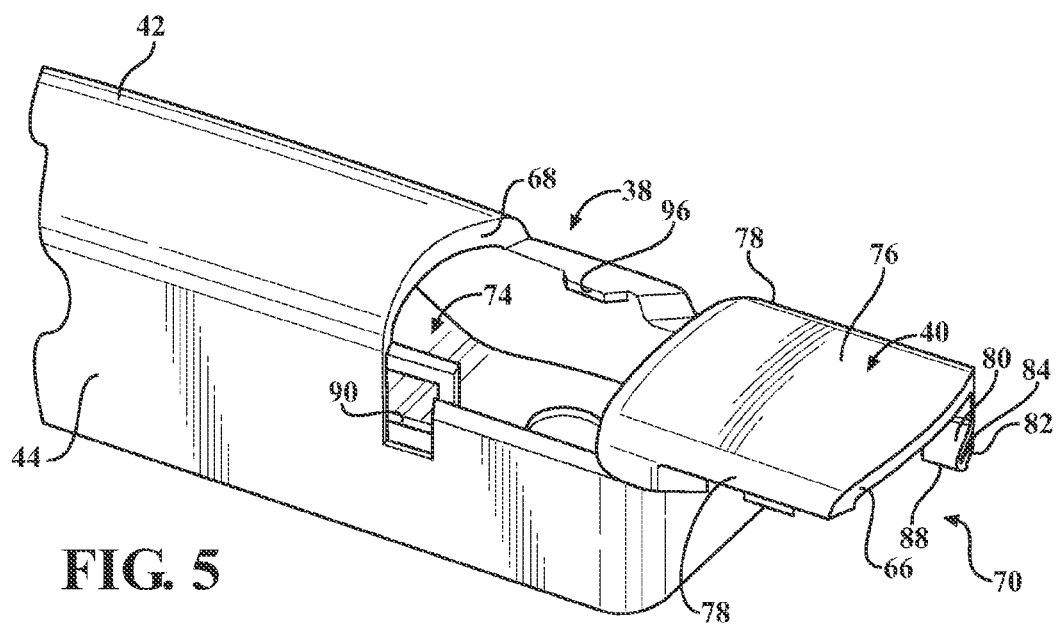
FIG. 5 is a partial perspective view of one end of the wiper arm assembly of the present invention illustrating the head cover in its fully opened position.

The windshield wiper arm assembly 24 includes an elongated body 32. The elongated body 32 of the wiper arm 24 is operatively mounted to a pivot shaft 34, which, in turn, is driven by an electrical motor either directly or through appropriate linkages as is commonly known in the art. To this end, the arm 24 includes a head, generally indicated at 36, that is supported on the body 32 and adapted to be mounted to the pivot shaft 34 that defines a pivot axis P and drives the wiper blade 26 in an oscillating manner across the surface to be wiped. The head 36 is operatively mounted to the pivot shaft 34 via a nut 35 threaded onto the distal end of the pivot shaft or via any suitable fastener known in the related art. In addition, the body 32 includes an opening 38 (FIGS. 4 and 5) that provides access to the head 36 mounted to the pivot shaft 34. A cover, generally indicated at 40, is mounted to the body 32 at the opening 38 and is movable about an axis A substantially parallel to the pivot axis P from a first position closing the opening (FIG. 2) to a second position allowing access to the head 36 (FIG. 5). Each of these components of the windshield wiper arm assembly 24 will be described in greater detail below.

More specifically, the arm body 32 has a top wall 42 and side walls 44 depending from the top wall 42 so as to define an inversely open ended U-shape with an interior cavity 46. The head 36 is operatively supported by the body 32 in the interior cavity 46. To this end, the body 32 may include a pair of opposed bosses 48 formed on the interior cavity 46 opposite one another and that present a pair of inwardly facing openings 50. The head 36 may employ a pair of bearings 52 that are cooperatively received in the inwardly facing openings 50 such that the head 36 may pivot relative to the arm 32 about an axis defined by the bearings 52. A biasing member 54, such as a coiled spring, may be operatively connected between the head 36 and the interior cavity 46 of the arm body 32, as is commonly known in the art. The biasing member 54 generates a downward force on the wiper blade 26 as it oscillates across the surface to be wiped.

The inwardly facing openings 50 open in a direction that is below an imaginary horizontal line extending through the center of the bearings 52. The bearings 52 are disposed in sliding engagement with the opposed bosses 48. The downwardly angled inwardly facing openings 50 of the bearings 48 essentially captures the head 36 during assembly under the force provided by the biasing member 54. At the same time, this interaction allows rotation of the arm body 32 relative to the head. Moreover, the interaction of the bosses 48 with the bearings 52 functions as a bearingless joint between the arm body 32 and the head 36. Thus, the biasing member 54 retains the arm body 32 relative to the head 36 during use without the need of a rivet. The top wall 42 and sidewalls 44 of the arm body 32 essentially envelopes the arm/head joint from both sides as well as from the top. This arrangement offers protection from snow and ice buildup that commonly causes conventional arms to freeze during wintery weather conditions causing loss of arm load resulting in poor wipe quality. The internal joint formed between the opposed bosses 48 and the bearings 52 also offer superior serviceability by allowing the arm body 32 to be rotated about the axes defined between the bosses 48 and bearings 52 while maintaining excellent lateral strength. In addition, the operative interaction between the head 36 and body 32 requires no tools or fastening mechanisms and all components can be assembled by hand. Thus, the operation of the arm body 32 relative to the head 36 effectively lowers the cost of the joint formed therebetween.

Figure 6:
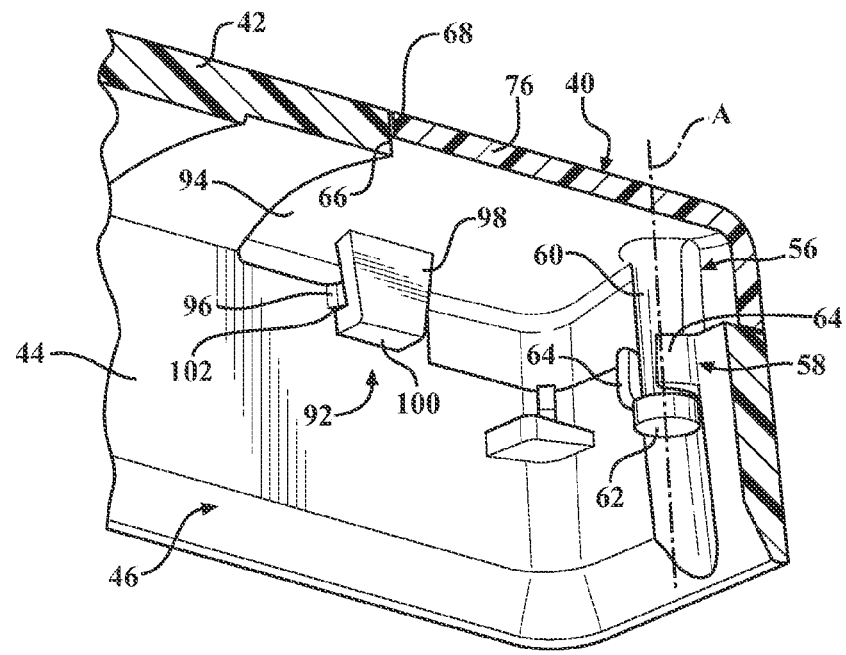
FIG. 6 is a partial perspective view of the interior cavity of one end of the wiper arm of the present invention illustrating the head cover disposed in the closed position.
Figure 7:
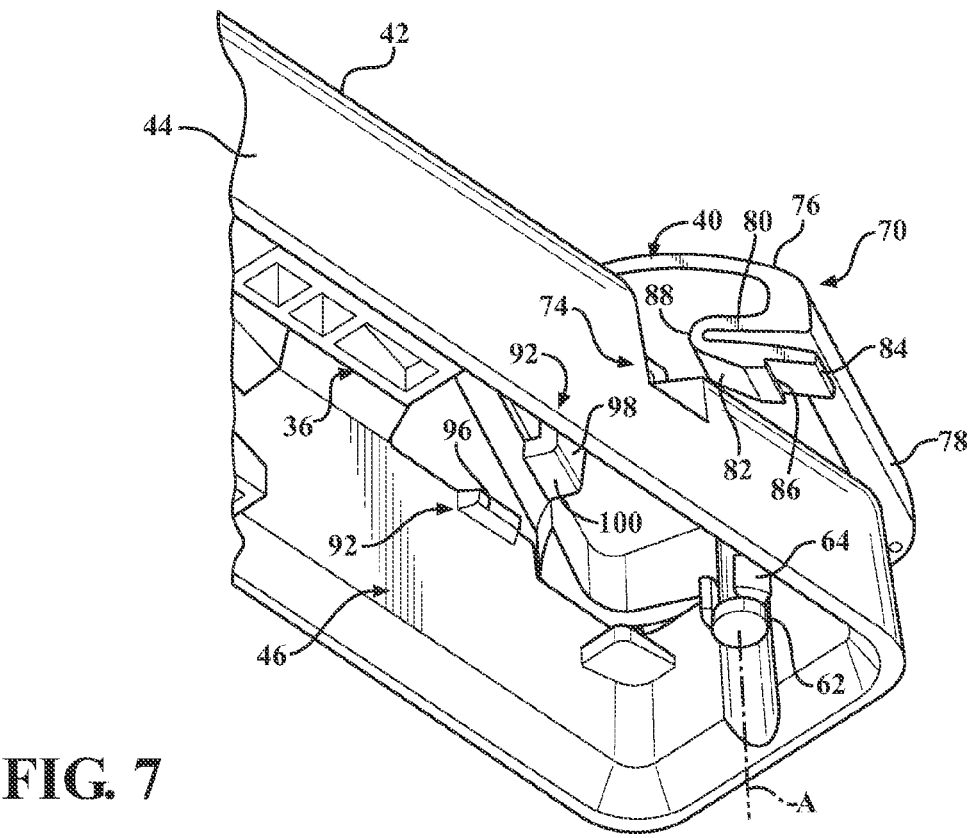
FIG. 7 is a partial perspective view of the interior cavity of one end of the wiper arm illustrating the head cover being swiveled between its open and closed position.

Referring now to FIGS. 6-7, the cover 40 includes a pivot pin, generally indicated at 56, that extends substantially parallel to the pivot axis P defined by the pivot shaft 34. The body 32 includes a retainer, generally indicated at 58, that operatively engages the pivot pin 56 and retains the pin 56 in a direction parallel to the pivot axis P but that allows rotational movement of the pin 56 about the axis A that is parallel to the pivot axis P. Thus, in one operative embodiment, the pivot pin 56 may include a cylindrical shaft 60 and an enlarged terminal portion 62 that is disposed at the distal end of the shaft 60. The retainer 58 may include a pair of arcuately extending arms 64 that are disposed about the cylindrical shaft 60 adjacent to the enlarged terminal portion 62 so as to allow the pivot pin 56 to rotate about the axis A that is parallel to the pivot axis P while retaining the pin 56 from movement in a direction parallel to this axis A. Thus, with reference to FIGS. 4-7, those having ordinary skill in the art will appreciate that the cover 40 of the present invention swivels about the axis A and that, unlike head covers known in the related art, it may not be inadvertently dislodged by rotating the cover about an axis that is transverse to the pivot axis P. Moreover, because of the swiveling action of the head cover 40, it may be manufactured to closer tolerances, eliminating gaps that can allow water, snow, and ice to enter into the opening, thereby affecting the performance of the wiper arm.

The cover 40 also defines an arcuate end 66 disposed opposite to the pivot pin 56 that cooperatively mates with an arcuate surface 68 defined by the top wall 42 of the arm body 32 adjacent the opening 38. These cooperating arcuate end 66 and surface 68 facilitate the swiveling movement of the cover 40 relative to the arm body 32, while maintaining very close tolerances and preventing water, snow, and ice from entering the opening. The cover 40 also includes a locking mechanism, generally indicated at 70, that releasably engages the body 32 when the cover 40 is in the first position closing the opening 38. The locking mechanism 70 includes a flexible arm 72. The arm body 32 defines a catch 74 and the flexible arm 72 is adapted for releasable engagement with the catch 74 so as to be snapped fit relative to the body 32.

More specifically, the cover 40 defines a top wall 76 and side walls 78 depending therefrom. The flexible arm 72 has a first portion 80 that extends spaced and cantilevered from the side wall 78 in a first direction. In addition, the flexible arm 72 includes a second portion 82 that is spaced from the first portion 80 extending in a direction opposite to the first portion 80 and terminating in a distal end 84 with a shoulder 86 defined spaced from the distal end 84. A hinge portion 88 interconnects the first and second portions 80, 82 such that the second portion 82 flexes upon coming into contact with the catch 74 to move toward the first portion 80 until the shoulder 86 clears the catch 74 and locks the cover 40 in the first position closing the opening 38. In one embodiment, the catch 74 may include an opening that is defined in one of the side walls of the arm body 32. The shoulder 86 formed on the second portion 82 is adapted to be disposed in abutting engagement with the interior cavity 46 of the arm 24 when the cover 40 is in the first position. In one embodiment as illustrated in these figures, the catch 74 formed on the side wall 44 of the wiper arm 24 may be defined by a rectangular opening having a locking ridge 90 that engages the second portion 82 of the flexible arm 72. However, those having ordinary skill in the art will appreciate that the catch 74 may take numerous various structural forms without departing from the scope of the invention.

In addition, the cover 40 may also include a stop member 92 extending downwardly from the bottom 94 of the cover 40 into the interior cavity 46 of the arm body 32. The stop member 92 is located spaced from the locking mechanism 70 and disposed on the opposite side of the longitudinal axis of the arm body 32. The arm body 32 may include an inwardly extending projection 96 that is designed to cooperate with the stop member 92 to limit the rotational movement of the cover 30 when it is in its closed position. In one embodiment, the stop member 92 may be L-shaped with a longer first portion 98 extending downwardly from the bottom 94 of the cover 40 and a second shorter portion 100 extending toward the interior surface of the sidewall 44 of the arm body 32 so as to define a ledge 102. The ledge 102 cooperatively receives the projection 96 when the cover 40 is in its closed position.

In its operative mode, and when access is desired to the joint formed between the head 36 and the pivot shaft 34, the second portion 82 of the flexible arm 72 is moved toward the first portion 80 by biasing the distal end 84 upwardly, thereby releasing the shoulder 86 from the interior cavity 46 of the arm body 32 and the cover 40 is rotated about the axis A defined by the pin 56 and that is parallel to the axis P defined by the pivot shaft 34 such that the cover 40 is moved from its first closed position (FIG. 2) to its second, open position (FIG. 5). The wiper arm 24 may be quickly and easily mounted or removed from the pivot shaft 34 via the access to this joint through the opening 38. Once the wiper arm 24 has been suitably mounted, the cover 40 may be swiveled about the axis A defined by the pin 56 until the locking mechanism 70 once again engages the body 32 of the wiper arm 24 and the cover 40 closes the opening 38.

In this way, the windshield wiper arm assembly 24 of the present invention employs a head cover 40 that efficiently and effectively provides for access to the head 36 and the pivot shaft 34, but that is not susceptible to intrusion by water, snow, or ice and that is not easily dislodged or inadvertently removed during the process of washing the car and other interference with the wiper arm.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A windshield wiper arm assembly that is adapted to support a wiper blade as it moves across a surface to be wiped, said windshield wiper arm assembly comprising:
   a arm body and a head supported by said arm body and adapted to be mounted to a pivot shaft that defines a pivot axis and drives the wiper blade in an oscillating manner across the surface to be wiped, said arm body including an opening providing access to said head mounted to the pivot shaft; and
   a cover mounted to said arm body at said opening and movable about an axis substantially parallel to the pivot axis from a first position closing said opening to a second position allowing access to said head.

2. The windshield wiper arm assembly as set forth in claim 1 wherein said cover includes a pivot pin extending substantially parallel to the pivot axis, said arm body including a retainer that operatively engages said pivot pin and retains said pin for rotational movement about said axis that is parallel to the pivot axis.

3. The windshield wiper arm assembly as set forth in claim 2 wherein said pivot pin includes a cylindrical shaft and an enlarged terminal portion disposed at a distal end of said shaft, said retainers including a pair of arcuately extending arms that are disposed about said cylindrical shaft adjacent to said enlarged terminal portion so as to allow said pivot pin to rotate about said axis while retaining said pin from movement in a direction parallel to said axis.

4. The windshield wiper arm assembly as set forth in claim 1 wherein said cover includes a locking mechanism that releasably engages said arm body when said cover is in said first position closing said opening.

5. The windshield wiper arm assembly as set forth in claim 4 wherein said locking mechanism includes a flexible arm, said arm body defining a retainer, said arm adapted for releasable engagement with said retainer so as to be snapped fit relative to said arm body.

6. The windshield wiper arm assembly as set forth in claim 5 wherein said cover defines a top wall and side walls depending therefrom, said flexible arm having a first portion extending spaced and cantilevered from said side wall in a first direction, and a second portion spaced from said first portion extending in a direction opposite said first portion and terminating in a distal end, a hinge portion interconnecting said first and second portions such that said second portion flexes upon coming in contact with said retainer to move toward said first portion until said distal end engages said retainer and locks said cover in said first position closing said opening.

7. The windshield wiper arm assembly as set forth in claim 6 wherein said arm body has a top wall and side walls depending from said top wall so as to define an inversely open ended U-shape with an interior cavity, said retainer including an opening defined in one of said side walls, said distal end of said second portion adapted to be disposed in abutting engagement with said interior cavity when said cover is in said first position.

8. The windshield wiper arm assembly as set forth in claim 1 wherein said arm body has a top wall and side walls depending from said top wall so as to define an inversely open ended U-shape with an interior cavity, said head operatively supported by said arm body in said interior cavity.

9. The windshield wiper arm assembly as set forth in claim 8 wherein said assembly further includes a biasing member operatively connected between said head and said interior cavity of said arm body and adapted to generate a downward force on the wiper blade as it oscillates across the surface to be wiped.

10. A windshield wiper assembly comprising:
a wiper blade adapted to contact a surface to be wiped, a windshield wiper arm assembly that is adapted to support said wiper blade as it moves across a surface to be wiped and a coupler assembly that operatively interconnects said wiper blade and said windshield wiper arm assembly;
said windshield wiper arm assembly including a arm body and a head supported by said arm body and adapted to be mounted to a pivot shaft that defines a pivot axis and drives the wiper blade in an oscillating manner across the surface to be wiped, said arm body including an opening providing access to said head mounted to the pivot shaft; and
a cover mounted to said arm body at said opening and movable about an axis substantially parallel to the pivot axis from a first position closing said opening to a second position allowing access to said head.

11. The windshield wiper assembly as set forth in claim 10 wherein said cover includes a pivot pin extending substantially parallel to the pivot axis, said arm body including a retainer that operatively engages said pivot pin and retains said pin for rotational movement about said axis that is parallel to the pivot axis.

12. The windshield wiper assembly as set forth in claim 11 wherein said pivot pin includes a cylindrical shaft and an enlarged terminal portion disposed at a distal end of said shaft, said retainers including a pair of arcuately extending arms that are disposed about said cylindrical shaft adjacent to said enlarged terminal portion so as to allow said pivot pin to rotate about said axis while retaining said pin from movement in a direction parallel to said axis.

13. The windshield wiper assembly as set forth in claim 10 wherein said cover includes a locking mechanism that releasably engages said arm body when said cover is in said first position closing said opening.

14. The windshield wiper assembly as set forth in claim 13 wherein said locking mechanism includes a flexible arm, said arm body defining a retainer, said arm adapted for releasable engagement with said retainer so as to be snapped fit relative to said arm body.

15. The windshield wiper assembly as set forth in claim 14 wherein said cover defines a top wall and side walls depending therefrom, said flexible arm having a first portion extending spaced and cantilevered from said side wall in a first direction, and a second portion spaced from said first portion extending in a direction opposite said first portion and terminating in a distal end, a hinge portion interconnecting said first and second portions such that said second portion flexes upon coming in contact with said retainer to move toward said first portion until said distal end engages said retainer and locks said cover in said first position closing said opening.

16. The windshield wiper assembly as set forth in claim 15 wherein said arm body has a top wall and side walls depending from said top wall so as to define an inversely open ended U-shape with an interior cavity, said retainer including an opening defined in one of said side walls, said distal end of said second portion adapted to be disposed in abutting engagement with said interior cavity when said cover is in said first position.

17. The windshield wiper assembly as set forth in claim 10 wherein said arm body has a top wall and side walls depending from said top wall so as to define an inversely open ended U-shape with an interior cavity, said head operatively supported by said arm body in said interior cavity.

18. The windshield wiper assembly as set forth in claim 17 wherein said assembly further includes a biasing member operatively connected between said head and said interior cavity of said arm body and adapted to generate a downward force on the wiper blade as it oscillates across the surface to be wiped.

* * * * *